June 26, 1945.  J. C. THOMAS  2,379,048
GAUGE
Filed Dec. 1, 1943  3 Sheets-Sheet 1
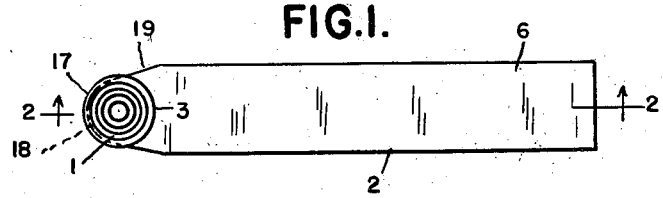
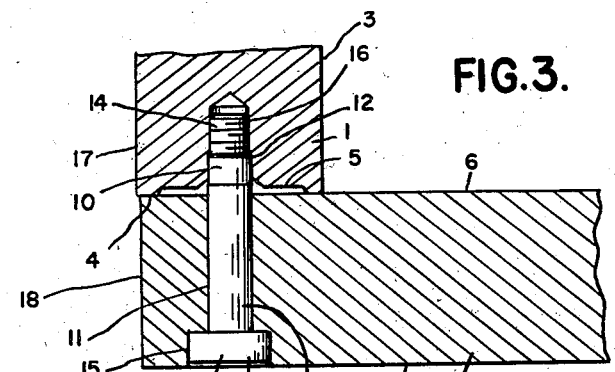
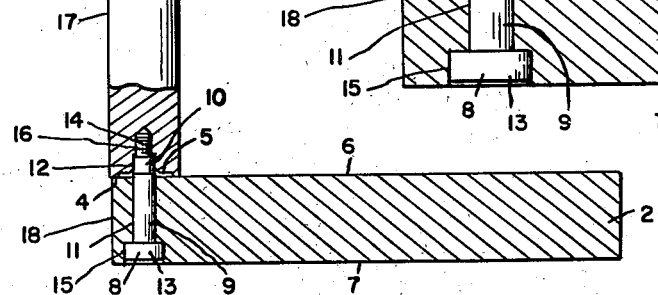
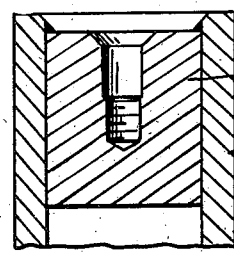
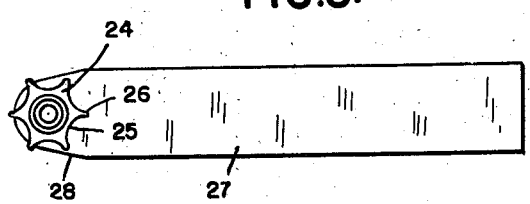
INVENTOR.
JAMES C. THOMAS
BY
ATTORNEYS June 26, 1945.　　　　J. C. THOMAS　　　　2,379,048
GAUGE
Filed Dec. 1, 1943　　　　3 Sheets-Sheet 2

INVENTOR.
JAMES C. THOMAS
BY
ATTORNEYS

June 26, 1945.　　　J. C. THOMAS　　　2,379,048
GAUGE
Filed Dec. 1, 1943　　　3 Sheets-Sheet 3

INVENTOR.
JAMES C. THOMAS
BY
ATTORNEYS

Patented June 26, 1945

2,379,048

UNITED STATES PATENT OFFICE 2,379,048

GAUGE

James C. Thomas, Detroit, Mich., assignor to Thomas Tool & Machine Company, Pontiac, Mich., a corporation of Michigan Application December 1, 1943, Serial No. 512,503

4 Claims. (Cl. 33—112)

The invention relates to gauges and refers more particularly to gauges adapted for use by tool makers, mechanics and inspectors.

The invention has for one of its objects to provide a gauge which is so constructed that it has a very high degree of accuracy.

The invention has for another object to so construct a gauge that it may be readily reconditioned to restore its accuracy.

The invention has for a further object to construct a gauge with hardened work surfaces so that the gauge has very long wearing properties.

With these as well as other objects in view, the invention resides in the novel features of construction and combinations and arrangements of parts as more fully hereinafter set forth.

In the drawings:

Figure 1 is a plan view of a gauge embodying the invention;

Figure 2 is a cross section on the line 2—2 of Figure 1;

Figure 3 is an enlarged view of a portion of Figure 2;

Figure 4 is a cross section similar to Figure 2 showing a modified construction of gauge;

Figure 5 is a plan view of another gauge;

Figure 6:
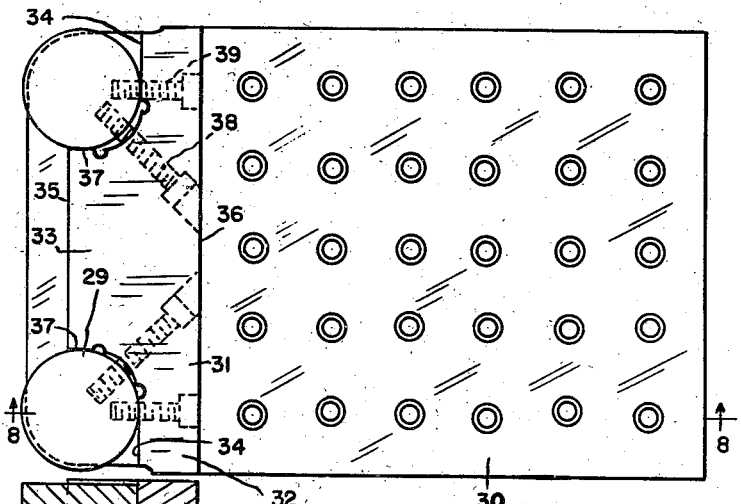
Figure 6 is a plan view of another gauge.

The gauges embodying the invention are commonly used by tool makers, mechanics and inspectors to check and support parts at definite angles and in definite positions for inspection and machining.

As illustrated in Figure 1, the gauge is a square comprising the post 1 and the plate 2 secured to each other. The post is a solid cylinder having the cylindrical surface 3, the annular end surfaces 4 and the central end surfaces 5 within the annular end surfaces and axially offset relative thereto axially inwardly of the post. The surfaces 3 and 4 are surfaces of revolution which are very accurately formed so that the cylindrical surface has its longitudinal elements parallel to the axis of the cylinder and the annular end surfaces are in planes at right angles to the axis of the cylinder. The cylinder is formed of steel or any alloy that can be hardened and the cylindrical and annular end surfaces are hardened and formed by grinding so that the work surfaces of the post have very long wearing and very accurate or precision properties and also retain their accuracy or precision for all normal use of the gauge. The plate 2 is preferably of greater width than the diameter of the post 1 and has the opposite surfaces 6 and 7 in parallel planes with the surface 6 in contact with an annular end surface 4 of the post. The plate is also formed of steel or any alloy that can be hardened and the surfaces 6 and 7 are hardened and formed by grinding with the result that these surfaces also have very long wearing and very accurate or precision properties and further retain their accuracy or precision for all normal use of the gauge.

The post is secured to the plate by means of the dowel pin screw 8 having the dowel pin portions 9 and 10, respectively, engaging the reamed parts 11 and 12 of bores in the plate and post for positioning the plate and post with an annular end surface of the post in contact with a surface of the plate so that the axis and the cylindrical surface of the post extend at right angles to the plate surface. The dowel pin portion 10 is preferably very slightly smaller in diameter than the dowel pin portion 9 while the reamed part 11 has a diameter for a sliding fit with the dowel pin portion 9 and the reamed part 12 preferably has the same diameter as the reamed part 11. The dowel pin screw also has the head 13 and the threaded stem portion 14, which latter is of smaller diameter than the dowel pin portion 10, the head being located in the recess 15 in the lower portion of the plate 2 and the threaded stem portion engaging the internally threaded part 16 of the post. The parts 12 and 16 extend axially of the post.

For the purpose of using a substantial portion 17 of the cylindrical side surface 3 of the post 1 with the surface 7 of the plate and also for the purpose of adequately supporting the post on the plate, the post is secured to an end portion of the plate and the end portion is formed with the arcuate edge 18 and the side edges 19 converging longitudinally of the plate toward the arcuate edge and connecting tangentially thereinto. The arcuate edge is concentric with the axis of the post and has a radius preferably slightly less than the radius of the cylindrical surface of the post so that the portion 17 is offset relative to the end portion of the plate and the latter cannot interfere. The radius of the arcuate edge is greater than that of the radially inner edge of the annular end surface 4 of the post so that the annular end surface contacts throughout 360° with the plate. As shown, the portion 17 is approximately one-half the cylindrical surface of the post. It is apparent that the remaining portion of the cylindrical surface of the post may be used with the surface 6 of the plate.

In the modification illustrated in Figure 4, the post 20, instead of being solid, is hollow, it being formed of the hollow cylinder 21 and the end plugs 22 permanently secured in the ends of the cylinder as by being welded thereto. These plugs are axially offset inwardly from the ends of the cylinder. The post 20 is preferably a seamless tube formed of steel, or any alloy that can be hardened, and has its cylindrical outer side surface and annular end surfaces hardened and ground so that they have a long wearing life and a very high degree of accuracy. The post is secured to the plate 23 in the same manner as illustrated in Figures 1, 2 and 3, the dowel pin screw having a dowel pin portion and a threaded stem portion engaging an end plug of the post.

Figure 5 illustrates another modified construction of gauge which is the same as that of Figures 1, 2 and 3, with the exception that the post 24 has its external side surface formed with the longitudinal flutes 25 and the arcuate longitudinal surface elements 26, the latter being hardened and formed by grinding and having the same radii from the axis of the post. It will be noted that the post has two longitudinal surface elements 26 which are in the longitudinal median plane of the plate 27 and that one of these extends preferably slightly beyond the adjacent end of the plate. It will also be noted that the post has two other longitudinal surface elements 26 which extend preferably slightly beyond the converging sides 28 of the beveled end portion of the plate and that each of these longitudinal surface elements is in line with another longitudinal surface element of the post longitudinally of the plate. The construction is such that the post has in effect a hexagonal cross section and also has peripherally spaced precision formed longitudinal surface elements on its external surface.

It is apparent that the post may be formed with other cross sections and also have an external side surface with hardened accurately ground longitudinally extending arcuate surface elements formed in the same manner as the post of Figure 5.

Figure 8:
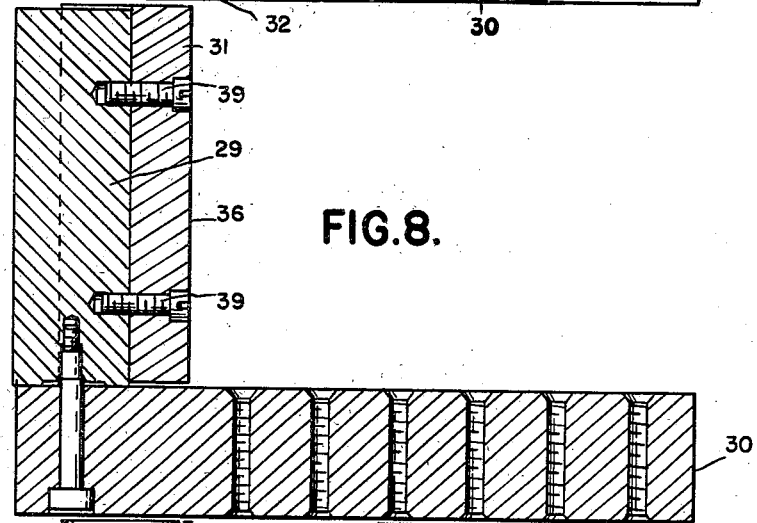
Figure 8 is a cross section on the line 8—8 of Figure 6.
Figure 7:
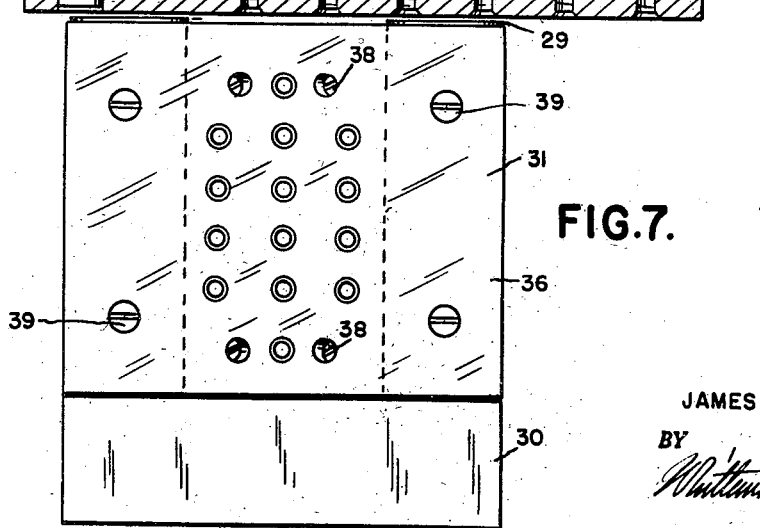
Figure 7 is an end view thereof.

In the modification illustrated in Figures 6, 7 and 8, the gauge is a sine square comprising the posts 29, the plate 30 and the sine plate 31. The posts 29 are formed in the same manner as the post 1 of Figures 1, 2 and 3 and the posts 29 are secured to the plate 30 in the same manner as the post 1 is secured to the plate 2. The posts 29 are secured to the plate 30 with their axes an exact predetermined distance apart. The plate 30 is rectangular and is formed with ground hardened surfaces in parallel planes formed in the same manner as the parallel surfaces of the plate 2. The sine plate 31 has the end portions 32 and the intermediate projecting portion 33. The surfaces 34 and 35 of the end portions and projecting portion are hardened and accurately ground to extend parallel to the surface 36 of the sine plate. The surfaces 37 at the ends of the projecting portion are also hardened and accurately ground and extend at right angles to the surfaces 34. The sine plate is secured to the posts by the screws 38 and 39 which are threaded radially into the posts and hold the surfaces 34 and 37 against the posts and maintain the posts at a definite distance apart agreeing exactly with the spacing of the posts in the plate 30 and with their axes parallel to the face 36 of the sine plate. The surface 36 of the sine plate 31 extends at right angles to the upper surface of the plate 30. Both the plates 30 and 31 are preferably formed with a number of drilled and tapped holes extending at right angles to their parallel faces for receiving suitable securing means used for attaching work or other gauge parts thereto. The posts 29 and also the plates 30 and 31 are formed of steel or any alloy which may be hardened and the work surfaces are all hardened and ground so that the sine square has very long wearing and very accurate or precision properties and retains its accuracy or precision for all normal use.

Figure 10:
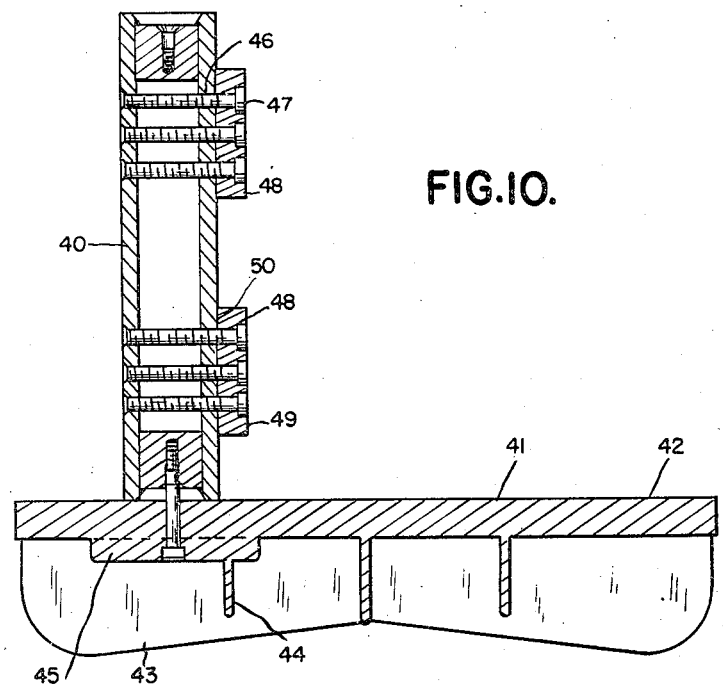
Figure 10 is a cross section on the line 10—10 of Figure 9.
Figure 9:
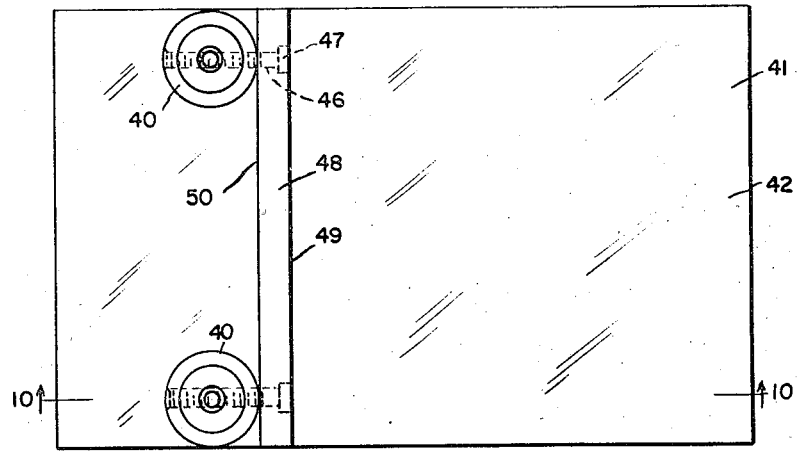
Figure 9 is a plan view of another gauge.

Figures 9 and 10 illustrate another modification of gauge which is designed primarily for use as a master checking gauge and may be used with squares and sine squares, for example, to check angles and also make projection checking. 40 are the posts and 41 is the surface plate to which the posts are secured. The posts 40 are formed in the same manner as the post 20 of Figure 4 and the posts are secured with an annular end surface of each against the surface 42 of the surface plate in the same manner as the post 1 is secured to the plate 2. The surface plate is formed to take care of the tension created by securing the posts to the surface plate and, as shown in the present instance, the surface plate has on its lower side the transverse reinforcing ribs 43 and 44 and it is also provided with the bosses 45 which are centrally provided in their lower surfaces with recesses for receiving the heads of the securing dowel pin screws. The posts 40 are provided with the transverse drilled and tapped holes 46 for receiving the screws 47 used in securing the plates 48 to the posts, these plates having the surfaces 49 hardened and ground parallel to the surfaces 50 which are clamped against the posts. As a result, the surfaces 49 extend definitely at right angles to the surface 42 of the surface plate.

From the above description, it will be seen that I have provided an improved gauge having hardened work surfaces which are very accurately ground. Also that I have provided an improved means for securing the parts of the gauge together providing for readily reconditioning the parts to restore their accuracy in case of damage or abuse.

What I claim as my invention is:

1. A gauge comprising a post having an annular end surface of revolution at right angles to the axis of said post and a side surface of revolution parallel to the axis of said post, a plate having opposite surfaces in parallel planes and having an end portion with an arcuate edge of less radius than that of said post, and means for securing said post to said end portion with said end surface of said post resting on one of said surfaces of said plate and with a substantial portion of said side surface of revolution offset beyond said arcuate edge.

2. A gauge comprising a post having an annular end surface of revolution at right angles to the axis of said post and a side surface of revolution parallel to the axis of said post, a plate having opposite surfaces in parallel planes and having a portion with an arcuate edge of less radius than that of said post, and means for securing said post and plate together with said end surface of said post resting on one of said surfaces of said plate, with said side surface of revolution and arcuate edge concentric, and with a substantial portion of said side surface of revolution of said post offset beyond said arcuate edge.

3. A gauge comprising a post having an end surface at right angles to the axis of said post and a side surface formed with longitudinal surface elements parallel to the axis of said post, a plate having a width greater than the diameter of said post and formed with parallel surfaces, said plate also having an end portion of reduced width, and means for securing said post to said end portion with said end surface of said post resting on one of the surfaces of said plate and with part of said side surface of said post offset beyond said end portion extending through a substantial angle.

4. A gauge comprising a plate having a surface in one plane, a post formed of a hollow cylinder and an end plug, said cylinder having a ground cylindrical surface of revolution and a ground annular end surface of revolution, said plug being spaced longitudinally inwardly of said cylinder from said end surface, and means engaging said plate and plug for securing said post to said plate with said end surface resting on said plate surface and with a substantial portion of said cylindrical surface offset beyond said plate.

JAMES C. THOMAS.